(No Model.)
J. S. WINTERMUTE.
MEANS FOR TRANSPORTING SEMINAL FLUID OF ANIMALS.
No. 507,193. Patented Oct. 24, 1893.
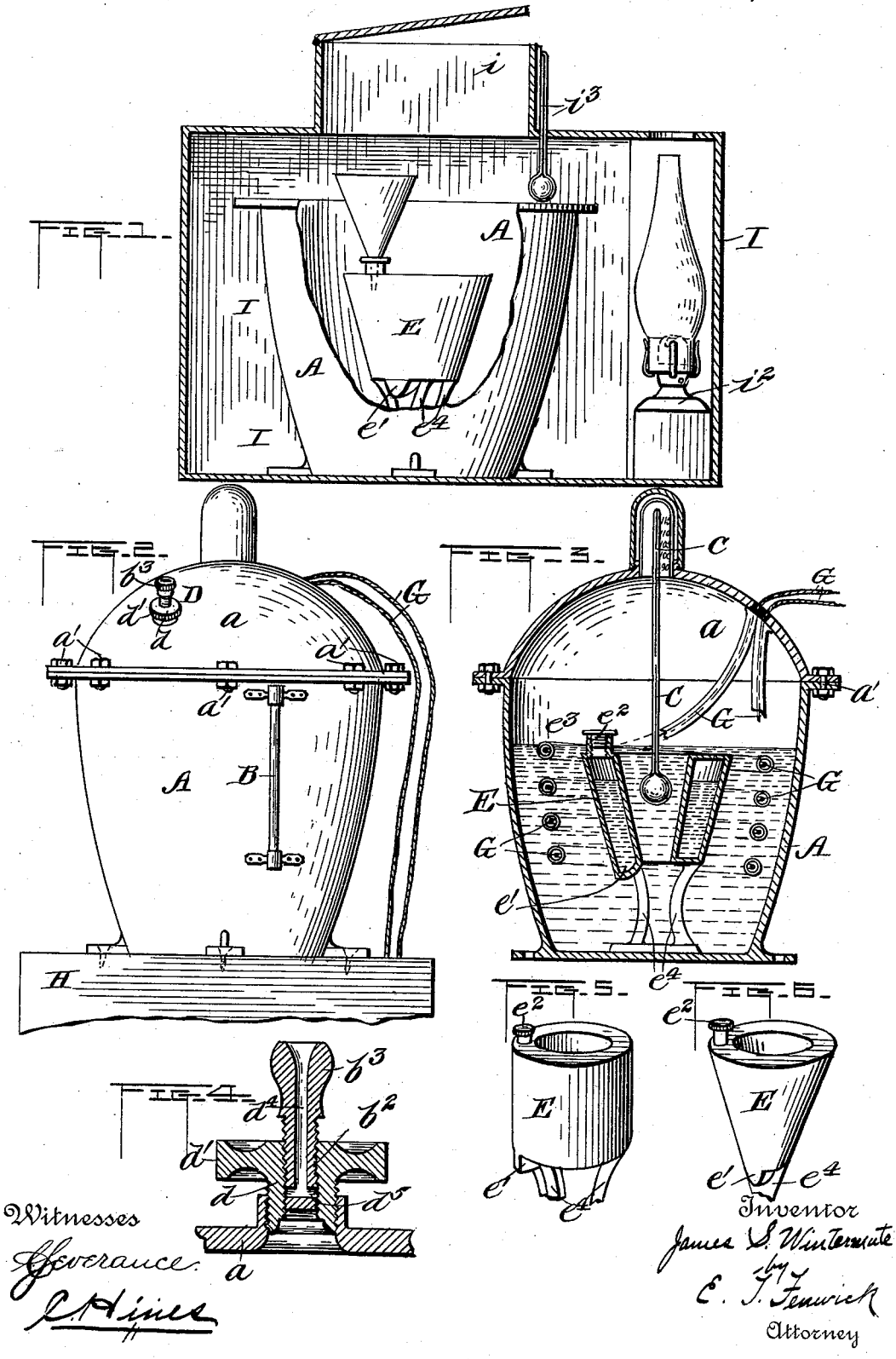

United States Patent Office.

JAMES S. WINTERMUTE, OF TACOMA, WASHINGTON.

MEANS FOR TRANSPORTING SEMINAL FLUID OF ANIMALS.

SPECIFICATION forming part of Letters Patent No. 507,193, dated October 24, 1893.

Application filed June 21, 1892. Renewed September 21, 1893. Serial No. 486,137. (No model.)

*To all whom it may concern:*

Be it known that I, JAMES S. WINTERMUTE, a citizen of the United States, residing at Tacoma, in the county of Pierce and State of Washington, have invented certain new and useful Improvements in Apparatus for Preserving the Seminal Fluid of Animals; and I do hereby declare the following to be a full, clear, and exact description of the invention, such as will enable others skilled in the art to which it appertains to make and use the same.

My invention consists in a novel and useful apparatus for containing, keeping or preserving and transporting the seminal fluid of animals in a condition for convenient use at such times as required.

In the accompanying drawings, Figure 1 is a vertical section, partly in elevation, of an outer containing vessel secured in position in a farm "filling box;" Fig. 2 a side elevation of the seminal retort attached to the top of a battery box, and showing the water gage, thermometer, screw plug or vent and the electrical heating wires. Fig. 3 is a vertical section of the same, the battery box being removed. Fig. 4 is a detail sectional view of the compound screw plug or vent for admitting air and water, and applied to the cover or lid of the seminal outer containing vessel. Figs. 5 and 6 are detail views of the seminal reservoir slightly modified as to shape.

It is customary at present in breeding animals to carry the male from place to place, or to bring the female animal to the male, which incurs considerable expense, inconvenience and danger to the animal being shipped, and it is to overcome these objections that this invention is intended by properly preserving the seminal fluid after it has been gathered. Male animal seminal fluid, under ordinary circumstances, retains its vigor (in the female vagina) for upward of two weeks, and, with my invention, the fluid will likewise retain its vigor for a similar period.
When a breeding act has occurred it only requires an infinitesimal amount of the male fluid to impregnate the female. Consequently a large quantity of the total amount afforded by any animal in the act of sexual intercourse is lost to further propagation. This surplus of seminal fluid, naturally deposited, is a provision of nature to guard against accidental isolation of the sexes after contact, that is, to say, to more perfectly insure pregnation of the female animal; and, after the natural act, a certain amount of this fluid can be removed from the vagina of the female and used for the purpose of shipment.

By my invention, after the seminal fluid has been removed from the animal, it can be immediately or remotely used for the purposes of artificial impregnation. After the fluid has been gathered, it is of vital importance that the same be preserved and be kept for subsequent use at periods immediate or remote at a constant temperature of not less than 90° nor more than 120° Fahrenheit. For accomplishing this result, I employ the following means:

A in the drawings represents what I term a "seminal retort," which is, preferably, of the shape shown, and is made of metal; say of iron, brass or copper, preferably polished, and adapted to receive and hold water and thus form a water bath. This outer containing vessel is provided with a lid or cover $a$ which is preferably secured in position by screws $a'$ passed through flanges on the cover and body of the outer containing vessel, and between these flanges suitable packing may be inserted or interposed. A water gage B is secured on the outside of the outer containing vessel and has communication with the water within, and indicates the height of the same. The thermometer C is also arranged on the outside of the outer containing vessel and has its bulb-end immersed in the water of the outer containing vessel for determining the temperature of the water and enabling a person in charge of the outer containing vessel to keep the water at the proper temperature, which, for the purpose of proper preservation of the seminal fluid, should not be lower than 90° nor more than 120° Fahrenheit.

D represents a compound thumb screw plug located in the lid or cover of the outer containing vessel for admitting water and air into the interior of the same. This plug consists of an outer, hollow internally and externally threaded screw threaded plug $d$ provided with a milled head $d'$ and a central vertical passage $b^2$, into which passage a smaller hollow, externally screw threaded plug $b^3$ is screwed.

This latter plug is provided with a central, vertical passage $d^4$ and outlet side passage $d^5$. When it is desired to let air into the interior of the outer containing vessel, without removing the cover or lid, which would seriously lower the temperature of the water, the hollow plug $d^3$ is screwed down through the hollow externally threaded plug $d$ until the side passages $d^5$ are exposed to the interior of the outer containing vessel, and, air passing through the central vertical passage $d^4$ of the plug, is admitted through said side passages into the outer containing vessel. Before shipping, or during the process of preservation, the outer containing vessel is supplied with a sufficient quantity of heated water, but, should it become necessary to add more water without removing the lid of the outer containing vessel, it could be done by simply unscrewing the plug $d$ from the lid and pouring in the desired quantity of water. The outer containing vessel is provided in its interior with a device E which I designate a "seminal reservoir," and which may be either in the form of an inverted truncated cone, as shown in Figs. 1 and 3, cylindrical, as in Fig. 5, an inverted cone, as in Fig. 6, or of any other suitable external form. It is made of light metal, thoroughly non-corrosive or chemically clean, and, as shown in Figs. 1 and 3, in form preferably that of an inverted truncated cone and formed with hollow encircling walls, which are porcelain lined on their inner surfaces or otherwise constructed so as to prevent chemical action of acid fluids coming in contact therewith; said walls terminating at the lower end of the reservoir in a gathering depression $e'$, into which the lower end of a barrel syringe is adapted to be inserted through the opening covered by the screw cap $e^2$ at the upper end of the reservoir.

The seminal fluid is contained within the hollow, encircling wall of the seminal reservoir, and the water occupies the central chamber $e^3$ and the chamber in the body of the retort, as shown, thus surrounding the seminal fluid on all sides, but out of contact with the same. The seminal reservoir is supported, in the outer containing vessel, on suitable legs or supports $e^4$, which latter are firmly secured to the bottom of the outer containing vessel, so that the heated water can come in contact with the bottom and inner and outer side of the seminal reservoir and preserve the temperature of the seminal fluid in the gathering depression $e'$ and in the walls of the seminal reservoir. The water in the outer containing vessel is kept heated at a uniform temperature by wires G connected with an ordinary battery not shown, or it may be heated in any other suitable manner. If electrical wires are employed, they will be quite fine, so as to offer a large amount of resistance to the current, and the wires will be covered with a non-combustible, water proof material or tubing. It is of the utmost importance that the temperature of the water, and consequently that of the seminal fluid, be kept at a proper height; and, for that reason, the fluid is surrounded on all sides by the water, and care must be taken that the water does not get too hot nor too cold. The outer containing vessel is firmly, yet removably, secured to the top of the battery box H by screws passed through the flanges on the bottom of the outer containing vessel, as shown in Fig. 2.

In Fig. 1, I have shown at I the outer containing vessel placed in what I term a "farm filling box," that is, a box in which the outer containing vessel is placed, while the seminal reservoir is being filled, which latter consists of a preferably rectangular shaped wooden hole provided with a lidded hand box $i$, through which the operator introduces the seminal fluid into the reservoir E through an ordinary glass funnel. The box is also provided with a lamp space in which is placed a lamp $i^2$, and with a thermometer $i^3$, as shown. The outer containing vessel is generally secured in position in the box with its lid and and the battery box removed, but if not removed from the battery box the filling box is constructed without a floor and the box is placed over the outer containing vessel and the temperature of the water and the seminal fluid preserved by the lamp $i^2$, the heat being indicated by the thermometer $i^3$.

To prevent lowering the temperature of the seminal fluid, in removing it from the filling box, and while securing the outer containing vessel to the battery box, the lid is immediately adjusted upon the outer containing vessel and the current turned on to preserve such temperature. When it is desired to ship the apparatus, it is removed from the filling box, its lid placed in position and firmly secured watertight and practically air tight, by means of screws and packing, and the retort secured to the top of the battery box. As the retort is water tight and practically air tight, and the temperature low, the water is not liable to evaporate nor is an explosion likely to take place. The filling box remains on the farm or other place, and is never shipped. Consequently an operator can fill any number of seminal reservoirs with one filling box. When it is desired to impregnate an animal, the lid or cover of the outer containing vessel is removed, the screw plug or cap of the seminal reservoir is taken off, and the lower end of the barrel syringe inserted into the gathering depression of the reservoir and the fluid drawn into the syringe, and the syringe, thus filled, is inserted into the mouth of the womb of the animal to be impregnated, and the fluid discharged from the syringe.

What I claim as my invention is—

1. An apparatus for containing and preserving the seminal fluid of animals, comprising a suitable outer containing vessel for holding water to be heated, means for heating the water and keeping the seminal fluid at a proper temperature, and a seminal reservoir within the outer vessel for containing the seminal fluid and adapted to be surrounded by the water, substantially as described.

2. In an apparatus for preserving and transporting the seminal fluid of animals, the combination of a suitable outer containing vessel for holding water to be heated, and a seminal reservoir placed in said vessel and adapted to be surrounded by the water, said reservoir having a hollow wall with a non corrosive or chemically clean lining which prevents chemical action, and provided at its lower end with a gathering depression and at its upper end with an opening for the introduction and removal of the seminal fluid, substantially as described.

3. In an apparatus for preserving and transporting the seminal fluid of animals, the combination of a suitable containing vessel for holding water, a seminal reservoir placed in said containing vessel and adapted to be surrounded by the water said reservoir consisting of a hollow surrounding wall which is formed at its lower end with a depression and at its upper end with an opening for the introduction and removal of the seminal fluid, and a central chamber for water, said reservoir being mounted on spaced supports whereby water is adapted to surround the seminal fluid on all sides but not allowed to come in contact with the same.

4. In an apparatus for preserving and transporting the seminal fluid of animals, the combination of a suitable vessel provided with a lid, said vessel being adapted to hold water, a seminal reservoir placed in said vessel and a compound water plug and air vent, substantially as described.

5. In combination with an outer filling box for receiving the seminal apparatus for the purpose described provided with auxiliary means for heating the same and a thermometer for registering the heat, of a containing vessel for preserving and transporting seminal fluid of animals, said vessel being adapted to hold and heat water and provided with a seminal reservoir for containing the seminal fluid, said reservoir being adapted to be surrounded by the heated water, substantially as described.

6. An apparatus for preserving seminal fluid of animals at a proper temperature for subsequent use at periods immediate or remote, said apparatus having an interior seminal reservoir surrounded by heated fluid, and means for heating the fluid.

7. The combination with a device for preserving the seminal fluid of animals comprising a suitable outer containing vessel and an inner seminal reservoir, said reservoir being formed with a central water chamber, of a thermometer having its tube bent to have its bulb located in the water chamber of the inner seminal reservoir and its face exposed to view on the outside of the outer containing vessel, the same serving for indicating the temperature of the water and thereby insuring the keeping of the seminal fluid at a proper temperature, substantially as described.

In testimony whereof I hereunto affix my signature in presence of two witnesses.

JAS. S. WINTERMUTE.

Witnesses:
B. B. GATTEL,
JAS. B. BEST.